United States Patent [19]
Tornay

[11] 3,922,987
[45] Dec. 2, 1975

[54] LIQUEFIED GAS TANKER CONSTRUCTION USING STIFFENER MEMBERS

[75] Inventor: Edmund George Tornay, New York, N.Y.

[73] Assignee: Conch International Methane Limited, Nassau, Bahamas

[22] Filed: Nov. 14, 1974

[21] Appl. No.: 523,685

Related U.S. Application Data
[63] Continuation of Ser. No. 384,123, July 30, 1973, abandoned.

[30] Foreign Application Priority Data
Aug. 2, 1972 United Kingdom............ 36011/72

[52] U.S. Cl............................. 114/74 A; 220/9 LG
[51] Int. Cl.²......................................... B63B 25/16
[58] Field of Search ...... 114/74 R, 74 A; 220/9 LG, 220/15

[56] References Cited
UNITED STATES PATENTS

| | | |
|---|---|---|
| 2,928,565 | 3/1960 | Glasoe, Jr..................... 220/9 LG |
| 3,083,668 | 3/1963 | Marciano.......................... 114/74 R |
| 3,298,345 | 1/1967 | Pratt................... 114/74 R |
| 3,547,301 | 12/1970 | Ffooks ......................... 114/74 R X |
| 3,595,424 | 7/1971 | Jackson ................. 220/15 |
| 3,719,302 | 3/1973 | Hamilton ..................... 114/74 A X |

*Primary Examiner*—George E. A. Halvosa
*Assistant Examiner*—Sherman D. Basinger
*Attorney, Agent, or Firm*—Max L. Libman

[57] ABSTRACT

A liquefied gas tanker with a double hull has plate stiffener members provided on the inward faces of the vertically extending walls of its cargo holds, which members support a lining of thermal insulation so as to be spaced from and generally parallel to said inward faces, said stiffener members having apertures whereby in operation of the tanker, any water leaking into the space between the walls and the insulation drains to the bottom of each cargo hold for removal. This construction utilizes the stiffener members for the walls also as the support for the lining of insulation, which is preferably carried by plywood panels connected together in side-by-side relationship on the stiffener members via securing strips and adhesive.

4 Claims, 4 Drawing Figures

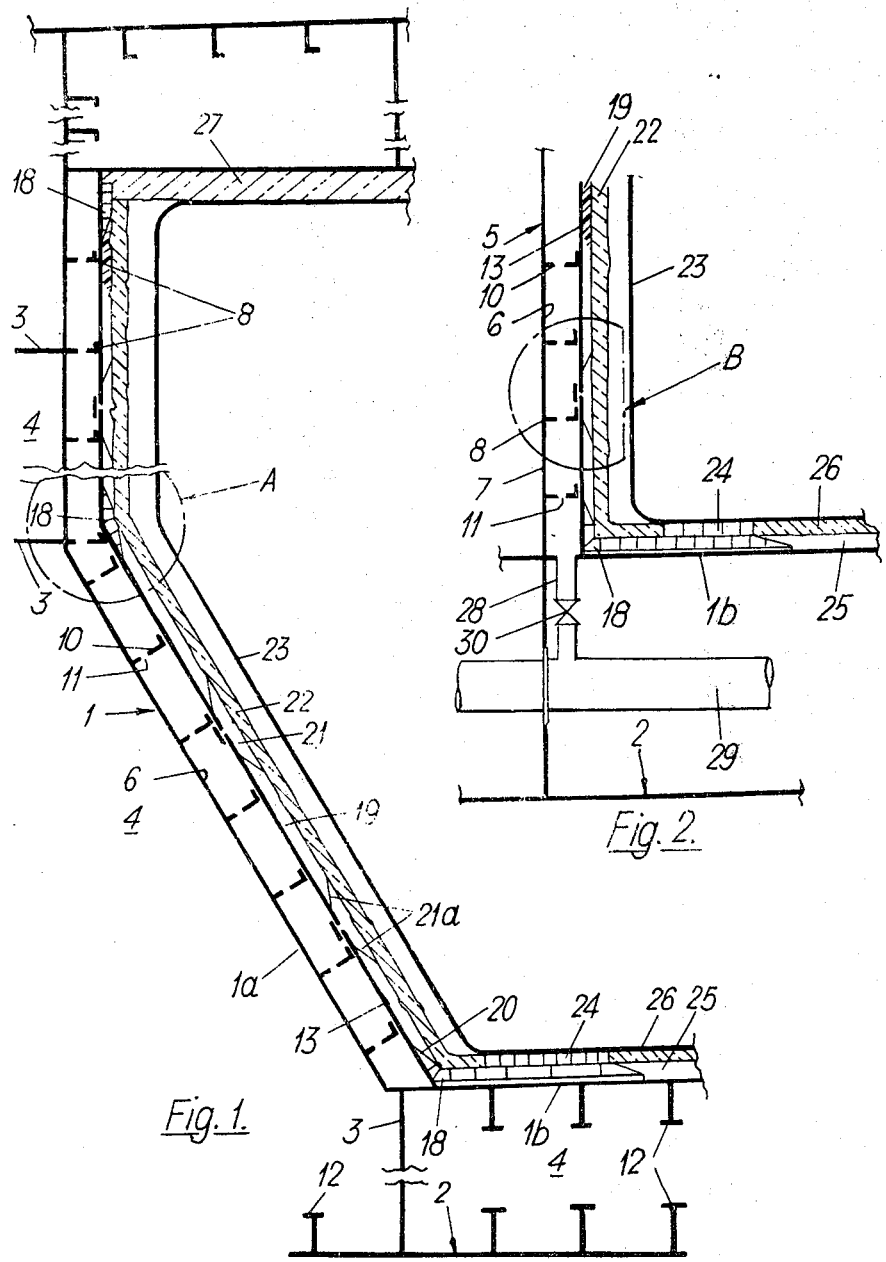

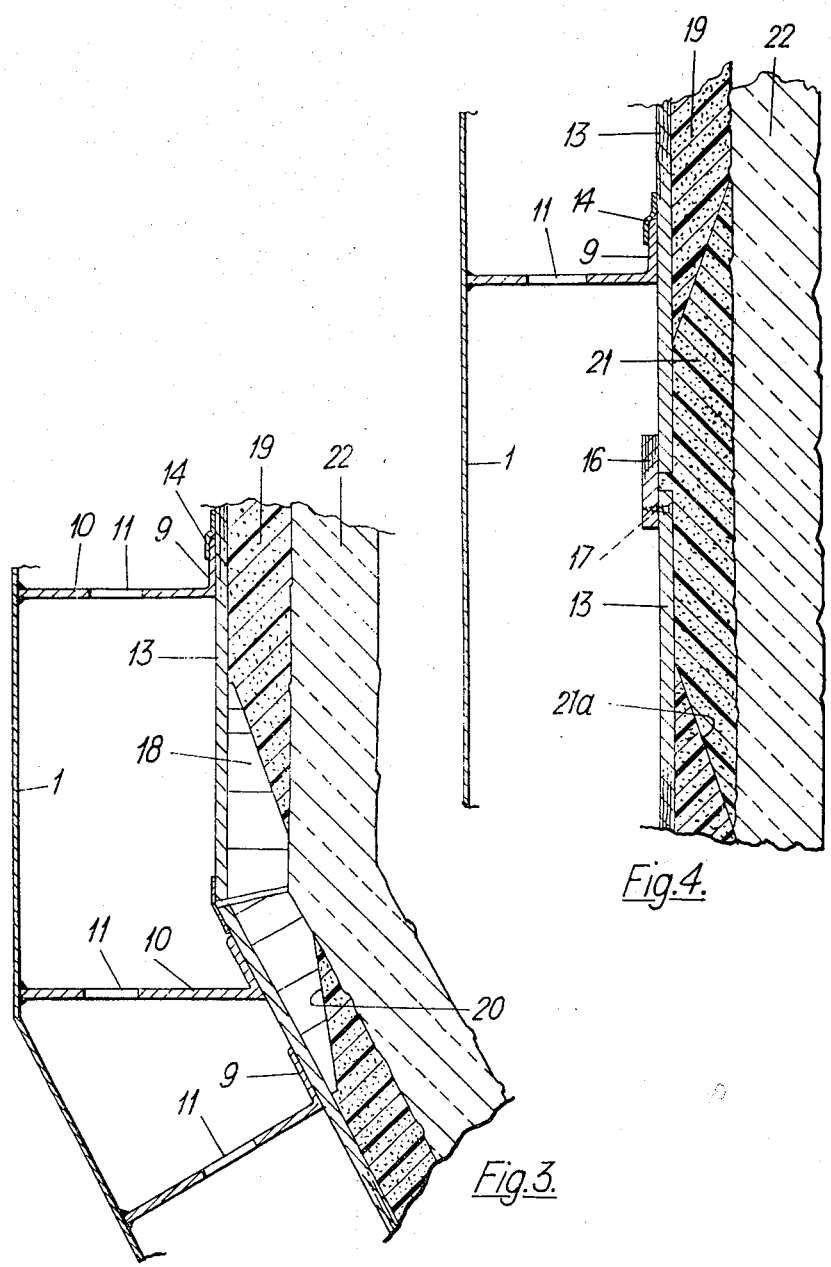

LIQUEFIED GAS TANKER CONSTRUCTION USING STIFFENER MEMBERS

This is a continuation of application Ser. No. 384,123, filed July 30, 1973 and now abandoned.

This invention relates to an improvement in tankers of the kind for the over-water transportation of cold liquids such as liquefied gases at near atmospheric pressure and low temperature. In such a tanker the cold liquid is contained in tanks located in thermally insulated cargo holds in the tanker. The tanks are of three distinct types. In one type, the tank is a self-supporting tank, i.e. having sufficient structural strength to hold the liquid and withstand the hydrostatic pressures and inertia forces, without depending upon other means outside the tank for aid in supporting the walls of the tank against buckling. The tank is of a material, e.g., metal, which is not subject to cold embrittlement at the temperature it is subjected to in use. The tank is thermally insulated externally by thermal insulation which either directly encases the tank or lines the cargo hold of the tanker so as to define a containing space within which the tank is located, with or without a gap between its exterior surface and the interior surface of the insulation.

Another type of tank is known as an integrated container and comprises a housing of solid load-bearing thermal insulation lined with a thin and flexible fluid-tight membrane tank of sheet material which again is not subject to cold embrittlement at the temperatures encountered in use and which is not self-supporting but is supported, against internal loads due to hydrostatic pressure and inertia forces, by the surrounding solid insulation. The insulation lines and is itself supported by the rigid cargo hold so that the insulation directly transmits to the cargo hold all the pressure exerted by the fluid upon the walls of the membrane tank.

The third type is generally referred to as the "semi-rigid" type and comprises a self-standing tank, i.e., a tank which will support its own weight only, the walls of which engage and are supported un use by solid insulation.

Usually such tankers each have a double hull and the inner hull is divided by a number of spaced transverse bulk-heads or cofferdams so as to divide the inner hull into a number of individual cargo holds. The space between the inner and outer hulls, and possibly also the space between the bulkheads of each cofferdam, if provided, is divided into tanks to contain water. Such water is provided for two purposes. One purpose is to serve as ballast for trimming and safe operation of the tanker. In this regard it is to be noted that in the case of a tanker for transporting liquefied gases, which are of low density, at least some ballast water may be provided in at least some of the ballast tanks even when the cargo tanks are full of liquid cargo. The second purpose is that, should there be a failure of the insulation, the ballast tank adjacent the part of the inner hull in the neighborhood of the affected part of the insulation can be filled with water, thus preventing the steel of the inner hull from being cooled below the safe level.

A problem encountered in such tankers is that, should a leak develop in the wall defined by the inner hull of a ballast tank, then water will penetrate into the adjacent cargo hold and into the insulation therein which will usually be partially water permeable, and the water will tend to flow toward the tank.

There is, of course, a thermal gradient across the thickness of the insulation, and water penetrating through the insulation towards the tank will progressively become colder and will freeze at a location below the freezing point of water. This would result in the build-up of ice within the outer thickness of the insulation. A serious difficulty then arises in that ice has a greater co-efficient of thermal conduction than the thermal insulation, so that the thermal insulating properties of the insulation would be prejudiced and therefore, heat would be transmitted to the tank, resulting in greater evaporation of the cargo and hull becoming cold. Moreover, in the case of a membrane tank, ice may form between the membrane tank and the insulation and could force a portion of the membrane away from the insulation, thereby overstressing said portion so that a fracture may occur.

A solution to the problem is proposed in U.S. Pat. No. 3,547,301, particularly in respect of a thermal insulation system comprising panels of insulation material mounted on spaced securing strips attached to the walls of the cargo hold. The solution proposed is the provision of drainage passages in said securing strips, whereby any water leaking into the cargo hold may pass freely through said passages and the space between the cargo hold walls and the panels to the bottom of the hold for removal by a pump or the like.

An object of the present invention is to provide an alternative solution to the problem in which it is not essential to provide securing strips on the wall of the cargo hold.

According to the invention, in a tanker for over-water transportation of cold liquids having a double hull, the inner hull defining at least one prismatic cargo hold, which is lined with a thermal insulation material for housing a tank for the cold liquid cargo, stiffener members are provided for the vertically extending walls of the cargo hold and are attached to those faces facing inwardly of said cargo hold, the lining of thermal insulation is supported by the stiffener members so as to be spaced from and generally parallel to said faces of the cargo hold, and apertures are provided in said stiffener members, the arrangement being such that, in operation of the tanker, any water leaking into the space between said vertically extending walls and the thermal insulation lining may drain freely through said apertures to the bottom of the cargo hold for removal.

Preferably, a number of cargo holds are provided which are separated from each other by vertically extending cofferdams in which case further stiffener members are provided on the inwardly facing faces of the cofferdams for attachment of the lining of thermal insulation over these latter faces, said further stiffener members also being provided with drainage apertures.

Thus, in such double-walled tankers it is standard known practice to provide the plate stiffener-members for the inner hull and cofferdams, the majority of which extend horizontally on that face of the inner hull or cofferdam bulkhead facing into the ballast space, thereby presenting a smooth face on the cargo hold side for mounting the thermal insulation. The invention utilizes these stiffener members by mounting them on the inner faces of the cargo holds, as the means for spacing the thermal insulation lining from the wall of the cargo hold to allow free passage to any water leaking through the inner hull of the tanker. Thus, the need for additional spacing members is avoided thereby providing a significant cost saving not only in raw material but, more particularly, in labor.

Preferably, each stiffener member provides a flange spaced from and extending generally parallel to the wall of its respective inner hull or cofferdam on which the insulation system is mounted.

The invention may be used in conjunction with the insulation system particularly described in U.S. Pat. No. 3,547,301, in which case the securing strips described in said specification may be attached to the plate stiffener members. Alternatively, where the stiffener members provide flanges spaced from and generally parallel to their respective walls of the cargo hold, the securing strips may be dispensed with, at least at the stiffener member location, and the panels mounted directly onto the flange of the stiffener members.

In another form, the invention may be used in conjunction with the insulation system described in U.S. Pat. No. 3,595,424. In that specification, rigid foamed plastic insulation material is sprayed onto the walls of each cargo hold over those areas which are less highly stressed, while the more highly stressed areas are provided with load-bearing insulation material. To provide a base for these two insulation materials, support walls spaced from and extending parallel to the cargo walls may be built up, for example, from plywood panels, suitably supported on the stiffener members.

In order that the invention may be readily understood and further features made apparent, a tanker for liquefied natural gas constructed in accordance with the invention will now be described, by way of example, with reference to the accompanying drawings in which:

FIG. 1 is a fragmentary transverse section through the tanker,

FIG. 2 is a fragmentary longitudinal section through the thanker,

FIG. 3 is an enlarges section of the detail referenced A in FIG. 1, and

FIG. 4 is an enlarges section of the detail referenced B in FIG. 2.

Referring to said FIGS. 1 and 2 of the drawing, the tanker comprises an inner hull 1 which is spaced inwardly of an outer hull, part of the bottom wall of which is shown at 2, the space therebetween being divided by vertical and horizontal partitions 3 to provide water ballast spaces 4. The lower part of each vertically extending wall of the inner hull, referenced 1a, for approximately one-third of the wall height, is angled, as shown in FIG. 1, to accommodate vertical corner stiffening webs (not shown) spaced along the length of the tanker and extending between the inner and outer hulls, said webs also acting as partitions for the water ballast spaces 4 in this region.

Transverse cofferdams 5 (see FIG. 2) are spaced along the length of the outer hull 2 so as to provide a line of cargo holds 6, each defined by opposing bulkheads 7 of the two adjacent cofferdams and that length of the inner hull between said cofferdams.

In accordance with the invention the vertically extendings walls of the inner hull 1 and the bulkheads 7 defining each cargo hold 6 are provided with plate stiffener members 8, said stiffener members being welded to those faces which face into said cargo hold, rather than the outer faces as is the normal practice in the art. The stiffener members 8 are of angle section (see FIGS. 3 and 4) and each member is welded to its respective face in such manner that the flange 9 thereof is spaced from and generally parallel to said face. It will be appreciated that the stiffener members may be of other suitable section, e.g., "T" - section or "I" -section. The webs 10 of the stiffener members have apertures 11 spaced along their length. As shown in FIG. 1, the bottom wall 1b of the inner hull and the outer hull 2 have, in accordance with standard known practice, their stiffener members 12, (in this embodiment of "T" -section) welded to the ballast space faces of said hulls.

The flanges 9 of the stiffener members 8 support rectangular panels 13 of plywood by way of clips 14 (FIGS. 3 and 4) on the rear faces thereof, each panel having two of its edges provided with plywood securing strips 16 (FIG. 4) at locations spaced from the flanges 9 by which each panel can be attached to two adjacent panels by means of a suitable adhesive and screws 17. The panels 13 thus provide support walls for the thermal insulation system and in turn are supported by and extend parallel to their respective walls of the cargo hold 6.

The thermal insulation system of this embodiment is similar to that described in U.S. Pat. No. 3,595,424 and comprises load-bearing corners 18 of balsa wood providing a "picture frame" within which a rigid polyeurethane foam 19 is sprayed in layers over the panels 13 and attached to the corners 18 along the planes of junction 20 which are spaced from the respective corners of the panel support walls and which extend obliquely to the plane of their respective panel support walls. Again, as described in said specification, strengthening materials (not shown) are provided between the sprayed layers.

In this embodiment, the layers of polyeurethane foam are sprayed onto the panels 13 prior to assembly in the tanker. Hence, the edges of the panels must be left free of the foam to facilitate assembly of said panels, the area over the panel joints being subsequently covered over by further foam 21 sprayed in situ and jointed to the prior sprayed foam via oblique planes 21a similar to the planes 20 for the foam/balsa joints.

The nature of the foam/balsa insulation system is sufficient to fulfill its function as a secondary barrier and a further thermal insulation effect is provided by a layer 22 of fibrous glass. This embodiment includes cargo tanks 23 of the self-supporting type and the insulation system lining the bottom wall 1b of each cargo hold 6 in the form of spaced lines 24 (see FIGS. 1 and 2) of load-bearing balsa panels which support the bottom of the tank. The spaces between the lines 24 are filled with layers of polyeurethane foam 25 and fibrous glass 26, the arrangement being as described in the copending U.S. Patent Application Ser. No. 181,711 of Robert G. Jackson, filed Sept. 20, 1971.

The top of each cargo tank 23 is simply insulated with a layer 27 of fibrous glass, since there is no requirement at this position for a secondary barrier.

In operation of the tanker, should the vertically extending walls of the inner hull 1 rupture, any water leaking therethrough is free to drain down through the space between said walls and the panel support walls and through the apertures 11 of the stiffener members into pipes 28 (see FIG. 2) extending from the bottom wall 1b of the inner hull and connected into the flow pipes 29 for the water ballast spaces via control valves 30. Preferably, each valve 30 is provided with means for indicating the presence of water, thus providing evidence of inner hull rupture, and may be controlled from a cryogenic equipment control room or other suitable control location.

It will be appreciated that the spacing of the thermal insulation lining from its cargo hold provides the additional advantage of spreading the effect of any cold leaking through minor fissures in the insulation thereby reducing the possibility of cold spots developing on the inner hull or cofferdams defining the cargo hold.

I claim:

1. a. In a tanker ship for over-water transportation of cold liquids having a metallic double hull,
   b. the inner hull of said double hull defining at least one prismatic cargo hold lined with a thermal insulation material, for housing a tank for the cold liquid cargo,
   c. the improvement comprising longitudinally extending horizontal metal plate stiffener members integrally fixed at one edge of the plate to the entire length of the vertically extending walls of the cargo hold at those faces facing inwardly of the cargo hold and of sufficient strength to substantially stiffen and strengthen said walls along their entire length, said stiffener members comprising metal strips extending inwardly toward said tank,
   d. said lining of thermal insulation being supported at the other edges of the stiffener members so as to be spaced from and generally parallel to said faces of the cargo hold,
   e. said stiffener members having spaced-apart apertures in said metal strips whereby, in operation of the tanker, any water leaking into the space between said vertically extending wall and the thermal insulating lining drains freely through said apertures to the bottom of the cargo hold for removal.

2. A tanker according to claim 1 wherein cofferdams are provided extending vertically and transversely of the hull to form a number of cargo holds, and further horizontally extending stiffener members are provided on the inwardly facing faces of the cofferdams for attachment of the lining of thermal insulation over these latter faces, said further stiffener members also having spaced drainage apertures.

3. a. In a tanker ship for over-water transportation of cold liquids having a metallic double hull,
   b. the inner hull of said double hull defining at least one prismatic cargo hold lined with a thermal insulation material, for housing a tank for the cold liquid cargo,
   c. the improvement comprising longitudinally extending horizontal metal plate stiffener members integrally fixed at one edge of the plate to the vertically extending walls of the cargo hold at those faces facing inwardly of the cargo hold and of sufficient strength to stiffen and strengthen said walls, said stiffened members comprising metal strips extending inwardly toward said tank,
   d. said lining of thermal insulation being supported at the other edges of the stiffener members so as to be spaced from and generally parallel to said faces of the cargo hold,
   e. said stiffener members having spaced-apart apertures in said metal strips whereby, in operation of the tanker, any water leaking into the space between said vertically extending wall and the thermal insulation lining drains freely through said apertures to the bottom of the cargo hold for removal,
   f. said thermal insulation including supporting and insulating panels which are mounted in side-by-side relationship on the stiffener members, wherein the lining of thermal insulation is carried by said panels,
   g. wherein the stiffener members having upwardly extending flanges spaced from and extending substantially parallel to their respective walls, and the panels are mounted on said flanges by means of clips provided on the rear faces of the panels and engaging said upwardly extending flanges.

4. a. In a tanker ship for over-water transportation of cold liquids having a double hull,
   b. the inner hull of said double hull defining at least one prismatic cargo hold assembled from plates and lined internally with a thermal insulation material, for housing a tank for the cold liquid cargo, and
   c. elongated stiffener members rigidly fixed continuously along their length to the inner hull plates and of sufficient strength and rigidity to ensure the necessary structural integrity of the entire extent of the inner hull,
   d. the improvement wherein said longitudinally extending stiffener members for the vertically extending walls of the cargo hold are of metal, said members being integrally fixed to those faces facing inwardly of said cargo hold and comprising relatively thin metal strips fixed along one edge to said faces and extending inwardly toward said tank,
   e. said lining of thermal insulation being supported at and by the inner edges of the stiffener members so as to be spaced from and generally parallel to said faces of the cargo hold,
   f. said stiffener members having spaced-apart apertures whereby, in operation of the tanker, any water leaking into the space between said vertically extending walls and the thermal insulation lining drains freely through said apertures to the bottom of the cargo hold for removal.

* * * * *